United States Patent
Noda et al.

(10) Patent No.: US 7,150,333 B2
(45) Date of Patent: Dec. 19, 2006

(54) VEHICLE CONTROL APPARATUS AND METHOD

(75) Inventors: Norihiro Noda, Shizuoka (JP); Tatsuji Mori, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 173 days.

(21) Appl. No.: 10/454,668

(22) Filed: Jun. 5, 2003

(65) Prior Publication Data
US 2004/0007405 A1    Jan. 15, 2004

(30) Foreign Application Priority Data
Jul. 10, 2002    (JP)    ................. P. 2002-201293

(51) Int. Cl.
*B60K 6/00*    (2006.01)
(52) U.S. Cl. ............ 180/65.2; 180/65.3; 180/65.4
(58) Field of Classification Search ............ 180/65.2, 180/65.3, 65.4; 477/3, 97, 98, 107; 701/54, 701/112
See application file for complete search history.

(56) References Cited

U.S. PATENT DOCUMENTS

| 5,818,116 A | * | 10/1998 | Nakae et al. ............. 290/38 R |
| 6,019,183 A | * | 2/2000 | Shimasaki et al. ......... 180/165 |
| 6,093,974 A | * | 7/2000 | Tabata et al. ............. 290/40 R |
| 6,258,008 B1 | * | 7/2001 | Tabata et al. ............... 477/107 |
| 6,269,895 B1 | * | 8/2001 | Tanuguchi et al. ......... 180/65.2 |
| 6,334,834 B1 | * | 1/2002 | Mizutani et al. ........... 477/203 |
| 6,390,947 B1 | * | 5/2002 | Aoki et al. .................. 477/3 |
| 6,396,165 B1 | * | 5/2002 | Nagano et al. ............ 307/10.6 |
| 6,556,910 B1 | * | 4/2003 | Suzuki et al. ................ 701/54 |
| 6,647,326 B1 | * | 11/2003 | Nakamori et al. ........... 701/22 |
| 6,692,402 B1 | * | 2/2004 | Nakamori et al. ............ 477/3 |
| 2002/0117860 A1 | * | 8/2002 | Man et al. .................. 290/46 |

FOREIGN PATENT DOCUMENTS

| EP | 1036694 | 9/2000 |
| JP | 6-257484 | 9/1994 |
| JP | 8-14076 | 1/1996 |
| JP | 3011069 | 12/1999 |

OTHER PUBLICATIONS

English Language Abstract of JP 6-257484.
English Language Abstract of JP 3011069.
English Language Abstract of JP 8-14076.

* cited by examiner

*Primary Examiner*—Christopher P. Ellis
*Assistant Examiner*—Vaughn Coolman
(74) *Attorney, Agent, or Firm*—Greenblum & Bernstein, P.L.C.

(57) ABSTRACT

A controller is provided for implementing a line pressure control for controlling a line pressure for an automatic transmission and a motor assist control for controlling an assist amount by an electric generator when an engine is put into an automatically restarted state from an automatically stopped state.

7 Claims, 5 Drawing Sheets

VEHICLE CONTROL APPARATUS AND METHOD

BACKGROUND OF THE INVENTION

The present invention relates to a vehicle control apparatus and method, and more particularly to a vehicle control apparatus for a vehicle in which an electric generator and an automatic transmission including a hydraulically controlled clutch are provided along a power transmission system or a drive train, in that an engine is controlled so as to be automatically stopped and restarted.

It frequently happens that vehicles have to stop while being driven in towns and at intersections. In case vehicles have to stop like that, since fuel continues to be consumed as long as the engine is running, there is caused a drawback that the fuel consumption gets worse. With a view to solving the drawback, there has been proposed a vehicle provided with an automatic stop and restart system for improving the fuel consumption by automatically stopping the engine when the vehicle stops temporarily and restarting the engine when the vehicle starts off (JP-A-6-257484). This automatic stop and restart system controls such that the engine is automatically stopped when a predetermined automatic stop condition is met where for example, the accelerator pedal has not been depressed for a certain period of time while the engine is running and is then automatically restarted when a predetermined automatic restart condition is met where for example, a start-off operation is attempted while the engine is automatically being stopped.

In addition, among vehicles there are so-called hybrid vehicles in which an engine and an electric generator (motor) connected to an engine output shaft are provided. In the hybrid vehicles, the startability of the vehicle is improved by an assist amount provided by a motor assist control of the electric generator. Among the hybrid vehicles of this type there are hybrid vehicles which include the aforementioned automatic stop and restart control system and an automatic transmission in which a clutch control for engaging and disengaging a clutch and a shift control for shifting gears are hydraulically implemented.

Incidentally, an oil pump for sending an oil pressure to an automatic transmission is normally driven by virtue of the revolution of a crankshaft of an engine. Due to this, when the engine stops, the oil pump also stops, and the oil pressure sent to the automatic transmission lowers. This has been causing a problem that when a vehicle is attempted to move from a standstill after the engine is restarted, there is caused a delay in raising the oil pressure that is sent to the automatic transmission, and less load is applied to the engine to thereby cause a drastic engine speed increase, while when the oil pressure to the engine is raised thereafter and the clutch is engaged, an engagement shock which is brought about by the engagement of the clutch is caused in the vehicle.

While a proposal has been made against the problem of drastic engine speed increase in which the drastic engine speed increase is restrained by the electric generator (Japanese Patent No. 3011069), nothing is mentioned therein on a countermeasure against the engagement shock caused when the clutch is engaged. In addition, although there has been proposed a method in which an electric oil pump is provided separately, so that the electric oil pump is driven to produce an oil pressure for engagement of the clutch while the engine is automatically stopped (JP-A-8-14076), this method has caused a drawback that electric power consumption is increased.

SUMMARY OF THE INVENTION

Then, with a view to removing the drawback, according to an aspect of the invention, a vehicle control apparatus for a vehicle comprising an engine, an electric generator connected to an engine output shaft, and an automatic transmission in which a clutch control for engaging and disengaging a clutch and a shift control are hydraulically implemented, the vehicle control apparatus comprises a controller for automatically stopping the engine when an automatic stop condition is met, while automatically restarting the engine when an automatic restart condition is met and implementing a line pressure control for controlling a line pressure of the automatic transmission and a motor assist control for controlling an assist amount by the electric generator when the engine is put in an automatically restarted state from an automatically stopped state.

According to the invention, when the engine is put in an automatically restarted state from an automatic stopped state, by implementing not only a line pressure control for controlling the line pressure of the automatic transmission but also a motor assist control for controlling the assist amount by the electric generator a reduction in load applied to the engine can be avoided through the control of the oil pressure of the automatic transmission and control of the drive of the electric generator when the vehicle is attempted to be started from rest after the engine has been restarted, whereby the drastic engine speed increase can be prevented even if no electrically operated hydraulic pump is provided separately, thereby making it possible to have a simple construction. In addition, according to the invention, the engagement shock that is caused when the clutch of the automatic transmission is engaged can be reduced, and moreover, the power consumption can be reduced, thereby making it possible to increase the attractiveness of the vehicle as a product.

DETAILED DESCRIPTION OF THE PREFERRED EMBODIMENTS

Figure 1:
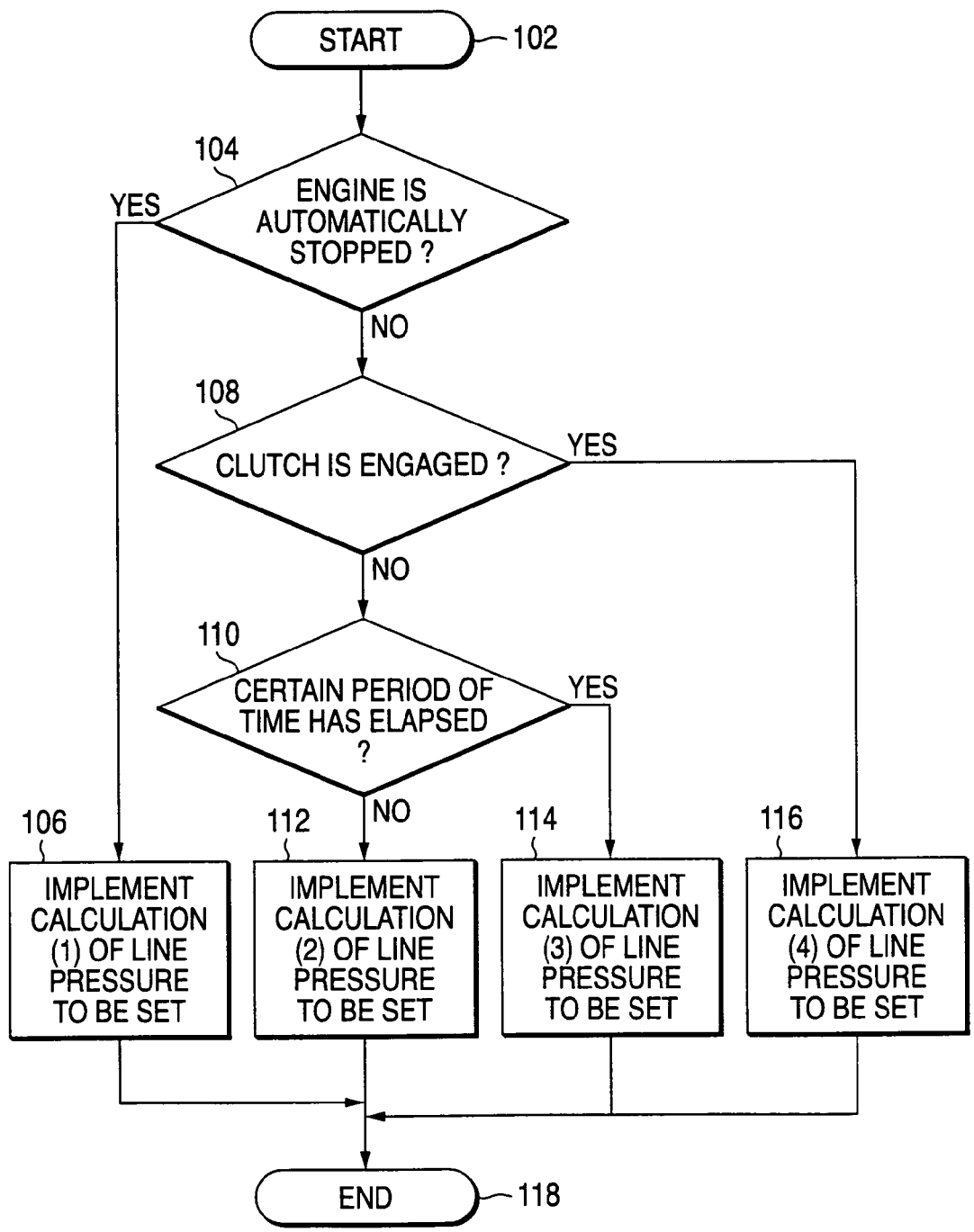
FIG. 1 is a flowchart of a control of the line pressure of a hydraulic circuit of an automatic transmission.

A detailed embodiment of the invention will be described below based on the accompanying drawings. FIGS. 1 to 6 show the embodiment of the invention. In FIG. 5, reference numeral 2 denotes a vehicle enabling the implementation of an automatic stop and restart control, reference numeral 4 an engine (E/G) installed in the vehicle 2, reference numeral 6 an electric generator (motor (M)/generator (G)), and reference numeral 8 an automatic transmission (A/T). The automatic transmission 8 includes a torque converter 10 and a transmission unit 12 and is controlled hydraulically. While not shown, the torque converter 10 is made up of a turbine, a pump impeller and a stator. While not shown, the transmission unit 12 includes planetary gears or the like.

The electric generator 6 is connected to an engine output shaft 14 of the engine 4. This electric generator 6 communicates with the torque converter 10 of the automatic transmission 8 via an input shaft 16. The torque converter 10 communicates with the transmission unit 12 via an output shaft 18. An end of a propeller shaft 20 connects to the transmission unit 12, and the other end of the propeller shaft 20 connects to a differential 22. Drive axles 24-1, 24-2 are coupled to sides of the differential 22, respectively, and road wheels 26-1, 26-2 are attached, respectively, to the drive axles 24-1, 24-2 which are so coupled to the differential 2. The driving force of the engine 4 is then transmitted to the wheels 26 via the electric generator 6, the automatic transmission 8, the propeller shaft 20, and the drive axles 24.

Figure 6:
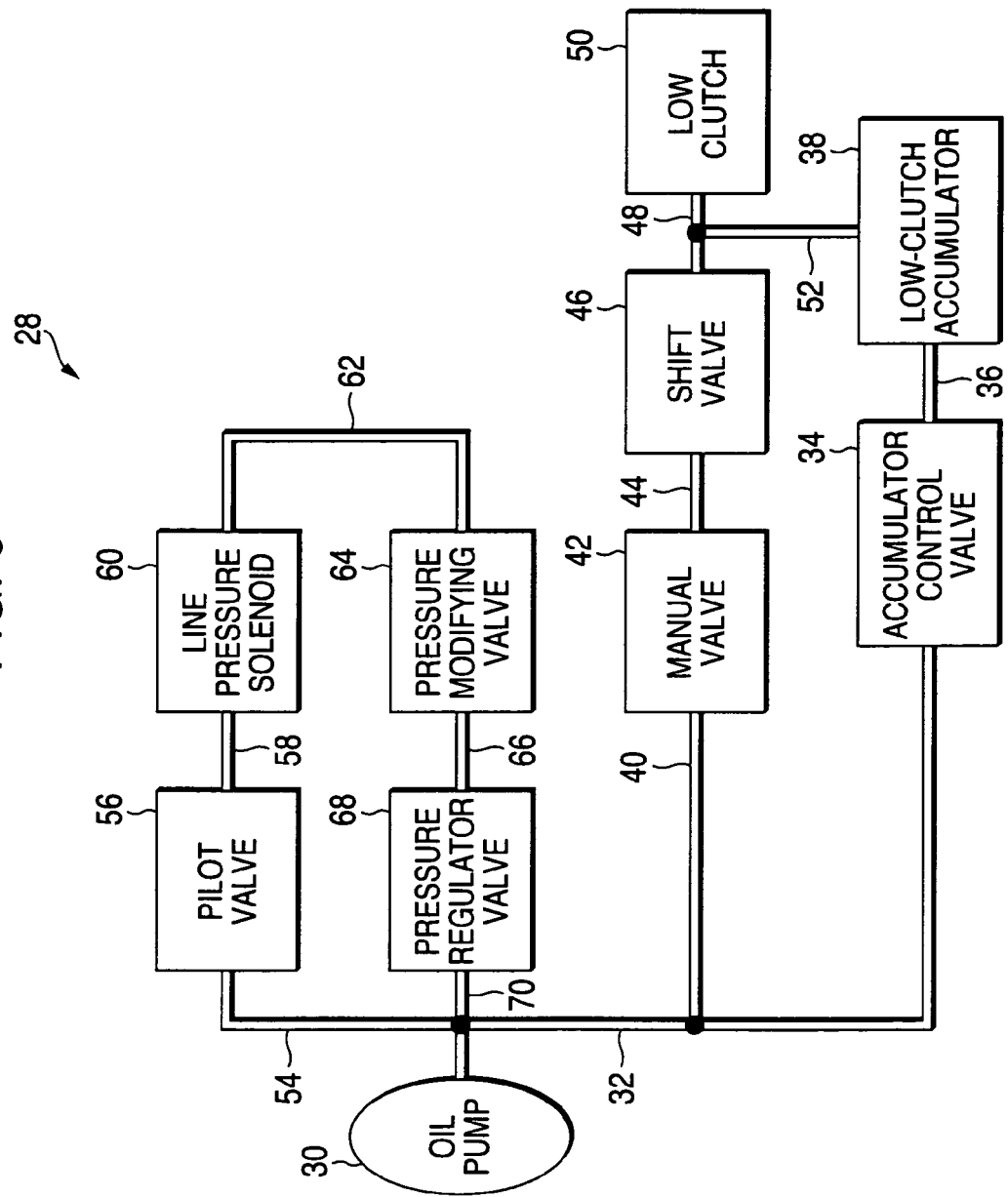
FIG. 6 is a diagram showing the configuration of the hydraulic circuit of the automatic transmission.

As shown in FIG. 6, a hydraulic circuit 28 is provided in the automatic transmission 8. An oil pump 30 adapted to be driven by the engine 4 is provided in the hydraulic circuit 28. An end of a line pressure fluid passageway 32 is connected to this oil pump 30. An accumulator control valve 34 is provided at the other end of the line pressure fluid passageway 32. A low-clutch accumulator 38 is allowed to communicate with the accumulator control valve 34 via an accumulator fluid passageway 36.

In addition, a manual valve 42 communicates with the line pressure fluid passageway 32 via a first valve fluid passageway 40 connecting to an intermediate position along the length of the line pressure fluid passageway 32 between the oil pump 30 and the accumulator control valve 34. A shift valve 46 is allowed to communicate with the manual valve 42 via a second valve fluid passageway 44. A low clutch 50 as a clutch is allowed to communicate with the shift valve 46 via a clutch fluid passageway 48. A clutch accumulator fluid passageway 52 communicating with the low-clutch accumulator 38 connects to an intermediate position along the length of the clutch fluid passageway 48.

Furthermore, a pilot valve 56 is allowed to communicate with the line pressure fluid passageway 32 via pilot valve fluid passageway 54 connecting to an intermediate position along the length of a part of the line pressure fluid passageway 32 which connects the oil pump 30 with the first valve fluid passageway 40. A line pressure solenoid 60 communicates with the pilot valve 56 via a solenoid fluid passageway 58. A pressure modifying valve 64 communicates with the line pressure solenoid 60 via a pilot pressure fluid passageway 62. A pressure regulator valve 68 communicates with the pressure modifying valve 64 via a valve communicating fluid passageway 66. A pressure regulator fluid passageway 70, which connects to the line pressure fluid passageway 32 at the position where the pilot valve fluid passageway 54 connects to the line pressure fluid passageway 32, communicates with the pressure regulator valve 68.

In addition, as shown in FIG. 5, a shift solenoid 72 and a lock-up solenoid 74 are provided in the transmission unit 12 of the automatic transmission 8.

The automatic transmission 8 is such that oil pressures from the oil pump 30 are used not only to engage and disengage the low clutch 50, which is the clutch, but also to implement a shift control for shifting gears.

Namely, in the automatic transmission 8, when the vehicle 2 is attempted to start from a standstill, a gear used to start off the vehicle 2 is normally a first gear, and in the case of this first gear, an output from the torque converter 10 is transmitted through a connection of two planetary gears (not shown) in the transmission unit 12 with the low clutch 50. In addition, an oil pressure generated from the oil pump 30 driven by the rotational movement of a crankshaft (not shown) of the engine 4 is used to control the planetary gears and the low clutch 50.

In addition, in the hydraulic circuit 28 of the automatic transmission 8, an oil pressure generated in the oil pump 30 is controlled as a line pressure of the line pressure fluid passageway 32 by regulating a pilot pressure in the pilot fluid passageway 62 which is applied to the pressure modifying valve 64 at the line pressure solenoid 60 using an oil pressure regulated at the pilot valve 56 to thereby regulate an oil pressure applied to the pressure regulator valve 68. The line pressure of the line pressure fluid passageway 32 passes through the manual valve 42 and the shift valve 46 and applies an oil pressure to the low clutch 50 to thereby get the low clutch 50 engaged. In addition, the low-clutch accumulator 38 communicates with the line pressure acting on the low clutch 50, and the low-clutch accumulator 38 is controlled through the line pressure of the line pressure fluid passageway 32 by the accumulator control valve 34. The oil pump 30 is not driven while the engine 4 is halted, and hence the line pressures in the line pressure fluid passageway 32 and the pilot pressure fluid passageway 62 fall flat and are lost and no line pressure is applied to the low clutch 50, which is then released. On the other hand, when the engine is started up, the oil pump 30 is driven, and the line pressures in the line pressure fluid passageway 32 and the pilot pressure fluid passageway 62 are raised, and the line pressures are then applied to the low clutch 50, this getting the low clutch 50 engaged.

As shown in FIG. 5, the engine 4, the electric generator 6 and the automatic transmission 8 communicate with a controller 76. This controller 76 is made up of an engine and transmission control unit (ECU) 78 and a motor inverter (motor control unit) 82 which is allowed to communicate with the engine and transmission control unit 78 via a communication line 80. The engine and transmission control unit 78 communicates with the engine 4 via an engine-side wiring harness 84 and also communicates with the automatic transmission 8 via a transmission-side wiring harness 86 which connects to the engine-side wiring harness 84. The motor inverter 82 communicates with the electric generator 6 via a motor-side wiring harness 88.

The engine and transmission control unit 78 of the controller 76 is such as to operate and control respective actuators of the engine 4 (such as a fuel injection valve 90 and an igniter 92) and respective components of the automatic transmission 8 (such as the shift solenoid 72, the line pressure solenoid 60 and the lock-up solenoid 74) via the engine-side wiring harness 84 and the transmission-side wiring harness 86, respectively when respective signals from the engine 4 and the automatic transmission 8 (such as on engine speed, coolant temperature, intake air pressure, throttle opening, turbine speed, vehicle speed and oil temperature) are inputted into the engine and transmission control unit 78 of the controller 76.

The motor inverter 82 of the controller 76 is such as to control the electric generator 6 when respective signals (such as on motor speed and motor temperature) are inputted thereinto via the motor-side wiring harness 88.

The engine and transmission control unit 78 and the motor inverter 82 perform communicative processes together to thereby implement a collaborative control.

The controller 76 includes in the engine and transmission control unit 78 an automatic stop and restart unit 78A for automatically stopping the engine 4 when an automatic stop condition is met and automatically restarting the engine 4 when an automatic restart condition is met and is adapted to implement a line pressure control for controlling the line pressure of the automatic transmission 8 via the engine and transmission control unit 78 and a motor assist control for controlling an assist amount by the electric generator 6 via the motor inverter 82 when the engine 4 is put in an automatically restarted state from an automatically stopped state.

In addition, the controller 76 includes in the engine and transmission control unit 78 an engagement determination unit 78B for determining whether or not the low clutch 50 is in engagement and is adapted to change the line pressure of the automatic transmission 8 and the assist amount by the electric generator 6 depending on whether or not the low clutch 50 is determined to be in engagement.

When controlling the line pressure, in the event that the clutch is not determined to be engaged, the controller 76 is such as to control the line pressure so as to stay at a high line pressure until the released state of the clutch is maintained for a certain period of time by a timer 78C provided in the engine and transmission control unit 78 and then to control the line pressure so as to be decreased.

The controller 76 is such as to compare a motor speed (an actual speed) of the electric generator 6 and a target speed of the electric generator 6 and then to implement the motor assist control when the motor speed is lower than the target speed.

The controller 76 is such as to determine the engagement of the low clutch 50 through at least either of a method for determining the engagement of the low clutch 50, which is a clutch, through a deviation between an engine speed of the engine 4 and a turbine speed of the torque converter 10 provided in the automatic transmission 8 (namely, when the deviation is large) and a method for determining the engagement of the low clutch 50 by determining whether or not the target speed which is determined from a vehicle speed and a gear of the automatic transmission 8 coincides with the turbine speed.

Namely, when the engine 4 is attempted to be restarted after it has automatically been stopped, the line pressure still remains lost, and the low clutch 50 is in a released state. Since the line pressure is not sufficiently raised immediately after the engine 4 is restarted, the low clutch 50 is still kept released, and the load being applied to the engine 4 is still low, causing a drastic engine speed increase. Thereafter, when the line pressure rises, since the low clutch 50 is brought into engagement in one breath, a problem is caused that an engagement shock is generated. However, according to the embodiment, this problem of generating the engagement shock is solved by controlling the line pressure of the automatic transmission 8 and the drive of the electric generator 6 which is directly coupled to the engine 4.

Next, the operation of the embodiment will be described.

Firstly, a control of the line pressure of the hydraulic circuit 28 of the automatic transmission 8 will be described based on a flowchart shown in FIG. 1.

Namely, as shown in FIG. 1, when a program of the controller 76 starts (Step 102), whether or not the engine 4 has been automatically stopped and still so remains is determined (Step 104).

If YES in Step 104, or in case the engine 4 remains in the automatically stopped condition, a calculation (1) of a line pressure to be set is implemented (Step 106). Namely, in this step 106, a line pressure (that is set, for example, to stop the energization of the line pressure solenoid 60) resulting when the engine 4 is automatically stopped is outputted.

If No in the step 104, or in case the engine 4 is not in the automatically stopped condition but is about to be restarted, the determination of the engagement of the clutch or the determination of whether or not the low clutch 50 is in engagement is implemented (Step 108). The determination of the engagement of the clutch is implemented by looking at a deviation between the engine speed and the turbine speed of the torque converter 10, i.e., determining whether or not the deviation is large, or by determining whether or not the target speed determined from the vehicle speed and a gear of the automatic transmission 8 coincides with the turbine speed.

If No in this step 108, or in case the low clutch 50 is released after the automatic restart of the engine 4 has been initiated, whether or not a certain period of time has elapsed since the low clutch 50 was put in a released state is determined (Step 110).

If No in this step 110, or in case the certain period of time has not yet elapsed since the low clutch 50 was put in the released state after the automatic restart of the engine 4 was initiated, a calculation (2) of a line pressure to be set is implemented (Step 112). In this step 112, a higher line pressure is outputted (pre-charged) with a view to attaining early rise in line pressure and pilot pressure, whereby a delay in clutch engagement can be minimized when the engine 4 is automatically restarted.

Since the low clutch 50 is brought into engagement in one breath to thereby generate a shock in case the control in the step 112 still continues even after a certain period of time has elapsed, if YES in the step 110, or in case the certain time has elapsed since the low clutch 50 was put in the released state after the engine 4 was automatically restarted, a calculation (3) of a line pressure to be set is implemented (Step 114). In this step 114, in order to prevent the engagement shock of the low clutch 50, a line pressure is set which is too low for the engagement shock to be generated. The line pressure setting in this step 114 is implemented based on, for example, throttle opening and vehicle speed, and a line pressure according to driving conditions is outputted. In this case, although there is caused a drastic engine speed increase because a line pressure which is slightly lower than a normal one is set, this problem will be solved by the electric generator 6 directly connected to the engine 4 in such a way as shown in FIG. 2, which will be described later on.

In case the determination of clutch engagement in Step 108 is positive or YES from the line pressure output in Step 114, a calculation (4) of a line pressure is implemented (Step 116). In this step 116, in order to have a smooth rise in power transmitted to the wheels 26, the line pressure is controlled so as to rise gradually, and thereafter, a minimum line pressure that is required to run the vehicle 2 (calculated from, for example, engine torque and throttle opening) is outputted.

After the respective line pressure controls have been completed in the respective steps 106, 112, 114, 116, the program ends.

Figure 2:
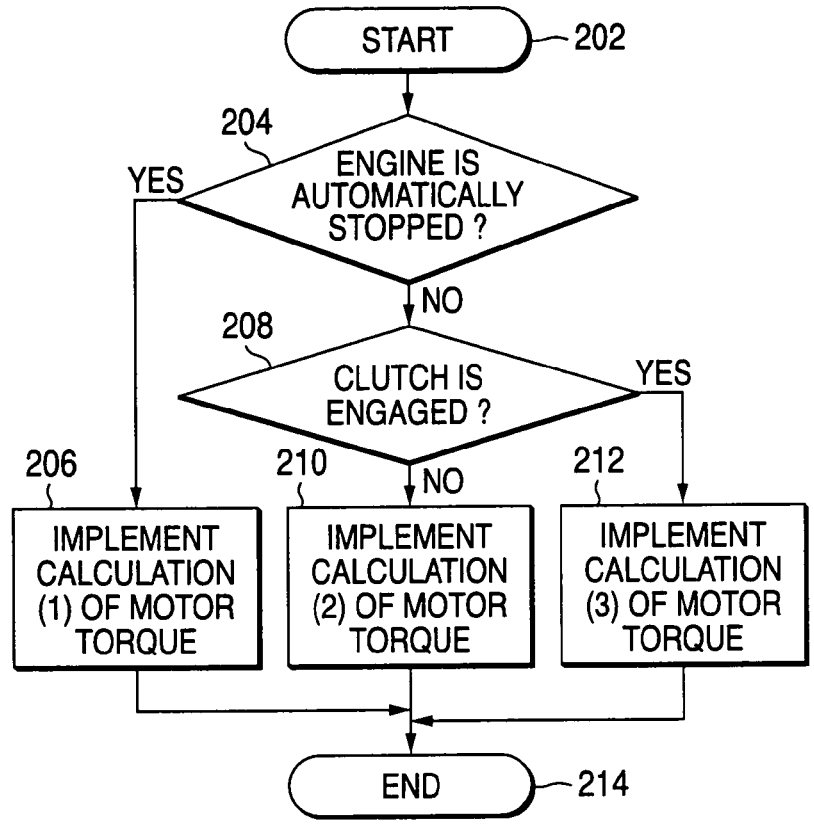
FIG. 2 is a flowchart of a control of the drive of an electric generator.

Next, as shown in FIG. 2, a control of the electric generator 6 directly connected to the engine 4 will be described.

Namely, as shown in FIG. 2, when the program of the controller 76 starts (in Step 202), whether or not the engine is automatically stopped is determined (Step 204). If YES in this step 204, or in case the engine is automatically stopped, a calculation (1) of a motor torque is implemented (Step 206). Namely, in this step 206, a motor torque (=0) when the engine is automatically stopped is outputted.

If NO in this step 204, or in case the engine is not automatically stopped but is automatically restarted, a determination of engagement of the clutch or whether or not the low clutch 50 is engaged is determined (Step 208). This determination of engagement of the clutch is implemented through, for example, a deviation between the engine speed and the turbine speed of the torque converter 10, i.e., by determining whether or not the deviation is large or by determining whether or not the target speed which is determined from the vehicle speed and the gear then engaged in the automatic transmission coincides with the turbine speed.

If NO in this step 206, namely, in case the low clutch 50 has not yet been engaged, a calculation (2) of a motor torque is implemented (Step 210). In this step 210, a motor torque is outputted which is large enough to bring the low clutch 50 into engagement and is small enough to prevent the occurrence of an engagement shock. For example, when the engine speed is low, in order to drive the oil pump 30, the torque of the electric generator 6 is controlled so as to be on a drive side to thereby increase the engine speed, and in contrast, when the engine speed is high, in order to prevent the occurrence of a shock caused by the engagement of the low clutch 50, the electric generator 6 is controlled so as to be on a power generation side to thereby prevent a drastic engine speed increase. As this occurs, while there occurs a drastic engine speed increase because the line pressure so set is slightly lower than a normal line pressure, this problem is solved by the electric generator 6 directly connected to the engine 4.

Then, if YES in Step 208 as a result of the engagement of the low clutch 50 by controlling the electric generator 6 so as to be on the power generation side to thereby prevent the occurrence of a drastic engine speed increase and setting the line pressure which is slightly lower than the normal line pressure, a calculation (3) of a motor torque is implemented (Step 212). In this step 212, when the control is started, in order to prevent a drastic change in power transmitted to the wheels 26 that is caused by the engagement of the low clutch 50, for example, the electric generator 6 is controlled such that the power generation torque thereof is gradually attenuated, and thereafter, a torque (calculated from, for example, throttle opening and vehicle speed) required for running the vehicle 2 is outputted.

Then, after the controls of the motor torque are completed in Steps 206, 210, 212, the program is completed (Step 214).

Figure 3:
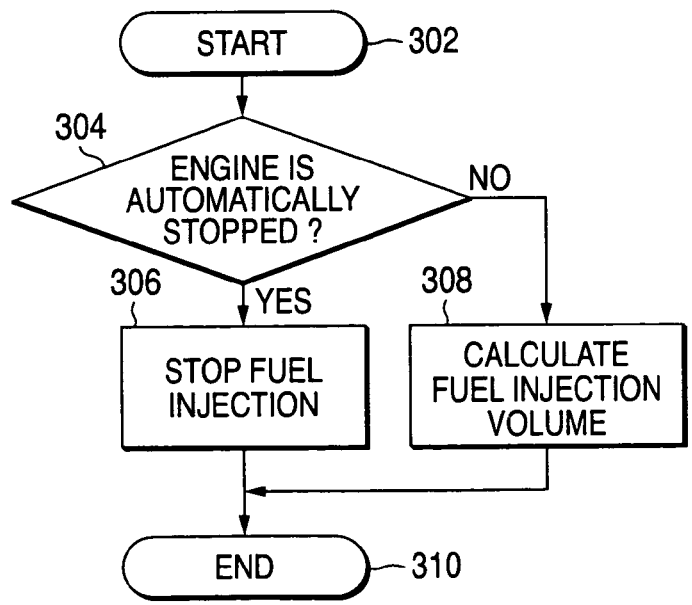
FIG. 3 is a flowchart of a control of the fuel injection of an engine.

Next, a fuel injection control as shown in FIG. 3 will be described.

Namely, as shown in FIG. 3, when the program of the controller 76 starts (Step 302), whether or not the engine 4 is automatically stopped is determined (Step 304).

If YES in this step 304, or in case the engine 4 is determined to be automatically stopped, a fuel injection is stopped (Step 306).

If NO in this step 304, or in case the engine 4 is automatically restarted, a fuel injection volume needed to run the vehicle 2 is calculated (from, for example, throttle opening) (Step 308).

Then, after the processes in Steps 306, 308 have been completed, the program is completed (Step 310).

Consequently, the controller 76 implements the controls described by the flowcharts shown in FIGS. 1 to 3 to control the line pressure and the electric generator 6, so that the engagement shock can be prevented which is caused when the low clutch 50 is brought into engagement after the engine 4 is automatically restarted, which is the object of the invention.

Next, the controls according to the embodiment will be described based on a time chart shown in FIG. 4.

Figure 4:
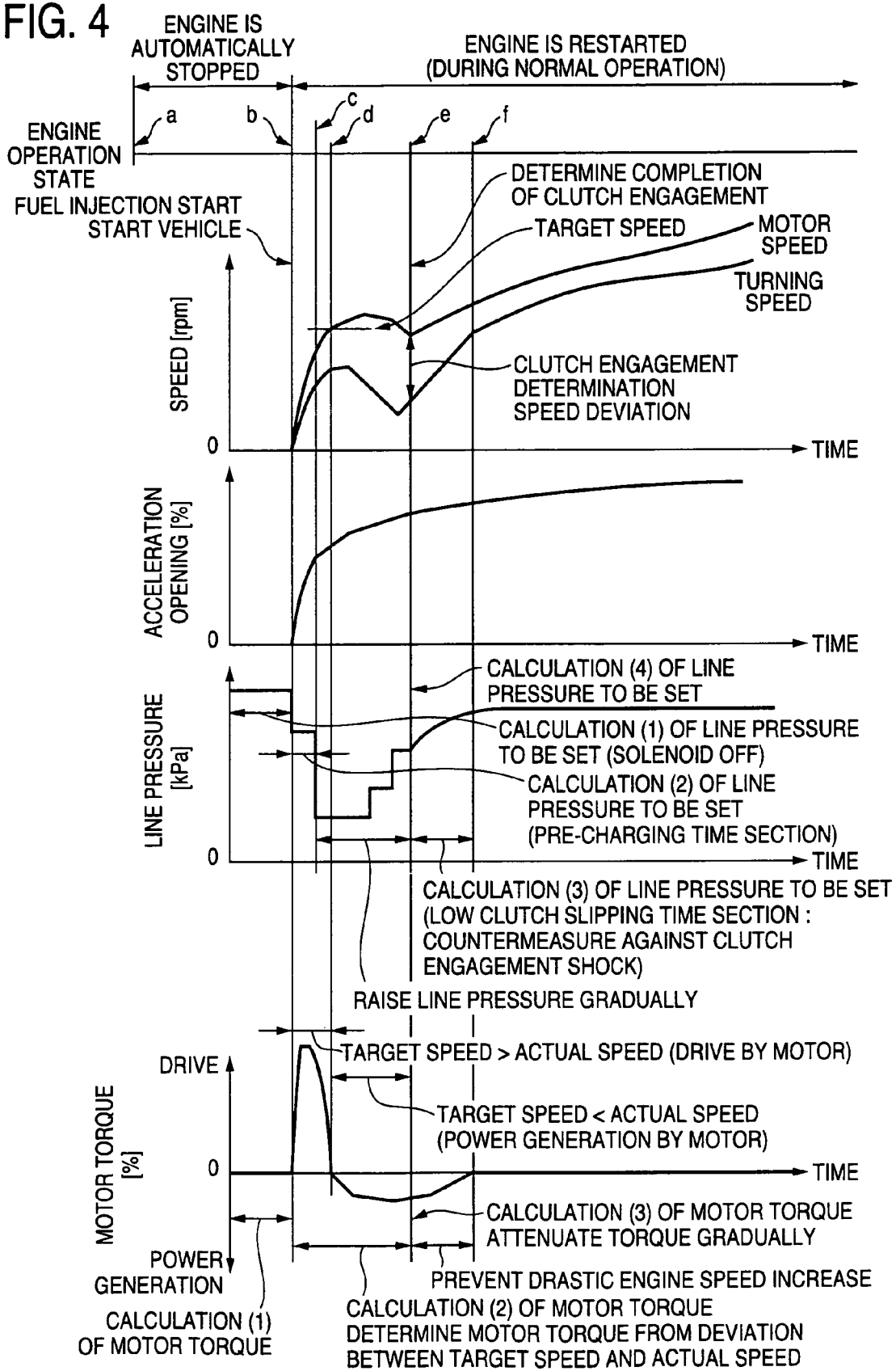
FIG. 4 is a time chart of a control of a vehicle.
Figure 5:
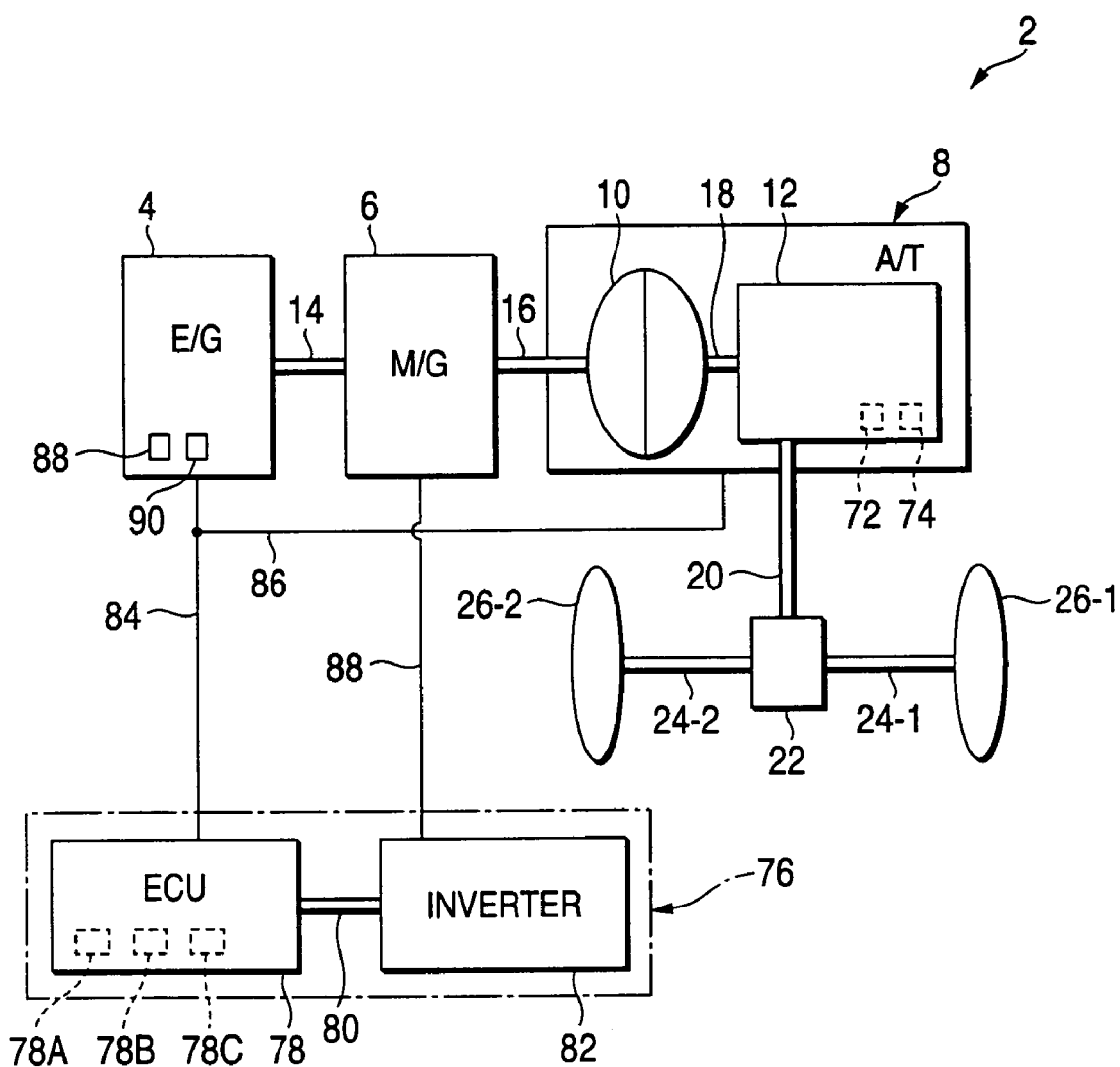
FIG. 5 is a schematic diagram showing the configuration of the vehicle.

Namely, as shown in FIG. 4, the engine 4 is automatically stopped during a time section between time points a and b, and the controller 76 implements the calculation (1) of a line pressure to be set and the motor torque calculation (1) and stops the fuel injection while following the flowcharts shown in FIGS. 1 to 3.

Then, in case the engine 4 is automatically restarted by a starting operation (depression of the accelerator pedal, or release of the depressed brake pedal (OFF)) by the driver who is attempting to start off the vehicle, as shown in the same flowcharts shown in FIGS. 1 to 3, the controller 76 implements the calculation (2) of a line pressure to be set and the motor torque calculation (2) and starts the fuel injection. The calculation (2) of a line pressure to be set is implemented in a time section between time points b and c, and the line pressure is pre-charged, whereby a delay in engagement of the clutch can be minimized when the engine 4 is automatically restarted.

Thereafter, the controller 76 implements the calculation (3) of a line pressure to be set and set the oil pressure of the low clutch 50 slightly lower during a time section between time points c toe (the calculation is performed based on vehicle speed and accelerator opening). This calculation (3) of a line pressure to be set continues until the low clutch 50 is brought into engagement at time point e to thereby prevent the engagement shock of the low clutch 50. The controller 76 starts the motor torque calculation (2) from time point b at the same time as it starts the line pressure calculation (3).

In case the engine 4 is automatically restarted at time point b, the electric generator 6 outputs the motor torque on the drive side thereof to thereby raise the engine speed until it reaches the target speed.

In case the engine speed reaches the target speed at time point d, the electric generator 6 then outputs the motor torque on the power generation side thereof to thereby prevent the occurrence of a drastic engine speed increase a time section between time points d and e.

The controller 76 continues the calculation (3) of a line pressure to be set and the motor torque calculation (2) until the low clutch 50 is determined to be engaged at time point e (from the fact that the deviation between the motor speed and the turbine speed is large). In case the low clutch 50 is determined to be engaged at the same time point, the controller 76 implements a calculation (4) of a line pressure to be set and a motor torque calculation (3). The calculation (4) of a line pressure to be set and the motor torque calculation (3) are such as to control the line pressure and the motor torque to be gradually raised and gradually attenuated, respectively, a time section between time points e and f with a view to increasing gradually the power that is transmitted to the wheels 26 by the engagement of the low clutch 50. On and after time point f, the controller 76 implements calculations of line pressures and motor torques that are required for running the vehicle 2.

According to the construction that has been described heretofore, it is possible to prevent the drastic engine speed increase and the engagement shock caused by the engagement of the low clutch 50 that are both understood to occur after the engine 4 is automatically restarted.

As a result of this, when the engine 4 is put in the automatically restarted state from the automatically stopped state, by implementing not only a line pressure control for controlling the line pressure of the automatic transmission 8 but also a motor assist control for controlling the assist amount by the electric generator 6 a reduction in load applied to the engine 4 can be avoided through the control of the oil pressure of the automatic transmission 8 and control of the drive of the electric generator 6 when the vehicle 2 is attempted to be started from rest after the engine has been restarted, whereby the drastic engine speed increase can be prevented even if no electrically operated hydraulic pump is provided separately, thereby making it possible to have a simple construction. In addition, according to the invention, the engagement shock that is caused when the low clutch 50 of the automatic transmission 8 is engaged can be reduced, and moreover, the power consumption can be reduced, thereby making it possible to increase the attractiveness of the vehicle as a product.

In addition, by changing the line pressure of the automatic transmission 8 and the assist amount by the electric generator 6 depending on whether or not the low clutch 50 is determined to be engaged the controller 76 determines a timing at which the low clutch 50 which provides a largest engagement shock is engaged and controls such that the engagement shock is reduced, thereby enabling a highly accurate control.

Furthermore, when controlling the line pressure, in case the low clutch 50 has not been determined to be engaged, the controller 76 controls such that the line pressure continues to stay at a high line pressure until a certain period of time has elapsed since the low clutch 50 was put in the released state and thereafter decreases. Therefore, the line pressure can be reduced at a timing when the low clutch 50 is about to be brought into engagement, thereby making it possible to reduce the engagement shock effectively.

Additionally, since the controller 76 compares the motor speed of the electric generator 6 with the target speed of the electric generator 6 and implements a motor assist control when the motor speed of the electric generator 6 is lower than the target speed thereof, in a state in which the low clutch 50 is not engaged, the controller 76 implements the motor assist control and raises the engine speed to thereby enhance the driving force of the oil pump 30, thereby making it possible to raise the line pressure.

Since the controller 76 determines the engagement of the low clutch 50 which is a clutch through at least either of a method for determining the engagement of the low clutch 50 through a deviation between an engine speed of the engine 4 and a turbine speed of the torque converter 10 provided in the automatic transmission 8 (or when the deviation is large) and a method for determining the engagement of the low clutch 50 by determining whether or not the target speed which is determined from the vehicle speed and a gear of the automatic transmission 8 coincides with the turbine speed, no special sensor is needed to determine whether or not the low clutch 50 is engaged, and the price of the system can be reduced. In addition, the vehicle control apparatus can be attempted to be made smaller in size.

Note that the invention is not limited to the embodiment that has been described heretofore and may be modified for various applications.

For example, while the automatic transmission is used in the above embodiment, the invention may be applied to a continuously variable transmission.

In addition, by using an ignition timing control and a fuel injection control in addition to the control of the automatic transmission and the electric generator or solely, the engine speed itself is reduced on the engine side to thereby prevent the drastic engine speed increase, thereby making it possible to realize a highly accurate control. In addition, in the vehicle, by using an electronically controlled throttle system, the volume of intake air is adjusted by adjusting the throttle opening when the engine is automatically restarted to thereby control the engine speed, thereby also making it possible to prevent the drastic engine speed increase.

Thus, as is clear from the detailed description that has been made heretofore, according to the invention, by providing the controller for implementing the line pressure control for controlling the line pressure of the automatic transmission, as well as the motor assist control for controlling the assist amount by the electric generator, the reduction in load applied to the engine can be avoided by controlling the oil pressure of the automatic transmission and the drive of the electric generator when the vehicle is started from a standstill after the engine has been restarted, and the drastic engine speed increase can thus be prevented even if no electrically operated hydraulic pump is provided separately, thereby making it possible to have a simple construction. In addition, the engagement shock caused when the clutch of the automatic transmission is engaged can be reduced and the power consumption can also be reduced, whereby the attractiveness of the vehicle as a product can be improved.

What is claimed is:

1. A vehicle control apparatus for a vehicle comprising an engine, an electric generator connected to an engine output shaft, and an automatic transmission in which a clutch control for engaging and disengaging a clutch and a shift control are hydraulically implemented, said vehicle control apparatus comprising:
   a controller configured to automatically stop the engine when an automatic stop condition is met, automatically restarting the engine when an automatic restart condition is met, and implementing a line pressure control configured to control a line pressure of the automatic transmission and a motor assist control configured to control an assist amount by the electric generator when the engine is put in an automatically restarted state from an automatically stopped state,
   wherein when controlling the line pressure, in case the clutch is not determined to be engaged, the controller controls the line pressure so as to stay at a high line pressure until a certain period of time elapses after the clutch is put in a released state and then controls the line pressure so as to be decreased.

2. A vehicle control apparatus as set forth in claim 1, wherein the controller compares a motor speed of the electric generator and a target speed of the electric generator and implements the motor assist control when the motor speed is lower than the target speed.

3. A vehicle control apparatus as set forth in claim 1, wherein the line pressure control includes a line pressure fluid passageway connected to an oil pump at one end, and provided with an accumulator control valve at another end.

4. A vehicle control apparatus for a vehicle comprising an engine, an electric generator connected to an engine output shaft, and an automatic transmission in which a clutch control for engaging and disengaging a clutch and a shift control are hydraulically implemented, said vehicle control apparatus comprising:
   a controller configured to automatically stop the engine when an automatic stop condition is met, automatically restarting the engine when an automatic restart condition is met, and implementing a line pressure control configured to control a line pressure of the automatic transmission and a motor assist control configured to control an assist amount by the electric generator when the engine is put in an automatically restarted state from an automatically stopped state,
   wherein said controller includes a clutch engagement determination portion and changes the line pressure of the automatic transmission and the assist amount of the electric generator depending on whether or not the clutch is determined to be engaged, and wherein the controller determines the engagement of the clutch through at least either of a method for determining the engagement of the clutch through a deviation between an engine speed of the engine and a turbine speed of a torque converter provided in the automatic transmission and a method for determining the engagement of the clutch by determining whether or not the target speed which is determined from a vehicle speed and a gear of the automatic transmission coincides with the turbine speed.

5. A vehicle control method as set forth in claim 4, wherein the line pressure control includes a line pressure fluid passageway connected to an oil pump at one end, and provided with an accumulator control valve at another end.

6. A vehicle control method for a vehicle comprising an engine, an electric generator connected to an engine output shaft, and an automatic transmission in which a clutch control for engaging and disengaging a clutch and a shift control are hydraulically implemented, said vehicle control method comprising the steps of:

automatically stopping the engine when an automatic stop condition is met;

automatically restarting the engine when an automatic restart condition is met; and implementing a line pressure control which includes controlling a line pressure of the automatic transmission and a motor assist control which includes controlling an assist amount by the electric generator when the engine is put in an automatically restarted state from an automatically stopped state, wherein when controlling the line pressure, in case the clutch is not determined to be engaged, the line pressure is controlled so as to stay at a high line pressure until a certain period of time elapses after the clutch is put in a released state and then the line pressure is decreased.

7. A vehicle control method for a vehicle comprising an engine, an electric generator connected to an engine output shaft, and an automatic transmission in which a clutch control for engaging and disengaging a clutch and a shift control are hydraulically implemented, said vehicle control method comprising the steps of:

automatically stopping the engine when an automatic stop condition is met;

automatically restarting the engine when an automatic restart condition is met; and implementing a line pressure control which includes controlling a line pressure of the automatic transmission and a motor assist control which includes controlling an assist amount by the electric generator when the engine is put in an automatically restarted state from an automatically stopped state, wherein a motor speed of the electric generator and a target speed of the electric generator are compared and the motor assist control is implemented when the motor speed is lower than the target speed.

* * * * *